Sept. 19, 1933.  N. CUSHMAN  1,927,230
FLEXIBLE VEHICLE AXLE
Filed Dec. 28, 1932  2 Sheets-Sheet 1

Sept. 19, 1933.  N. CUSHMAN  1,927,230
FLEXIBLE VEHICLE AXLE
Filed Dec. 28, 1932  2 Sheets-Sheet 2

Inventor
N. Cushman
By Clarence A. O'Brien
Attorney

Patented Sept. 19, 1933

1,927,230

UNITED STATES PATENT OFFICE 1,927,230

FLEXIBLE VEHICLE AXLE

Ned Cushman, Shreveport, La.

Application December 28, 1932
Serial No. 649,217

2 Claims. (Cl. 280—124)

This invention relates to a flexible vehicle axle, the general object of the invention being to provide means whereby the frame and body of a vehicle can be lowered without decreasing road clearance.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Fig. 3 is a perspective view of the hook-shaped ratchet member.

Figure 1:
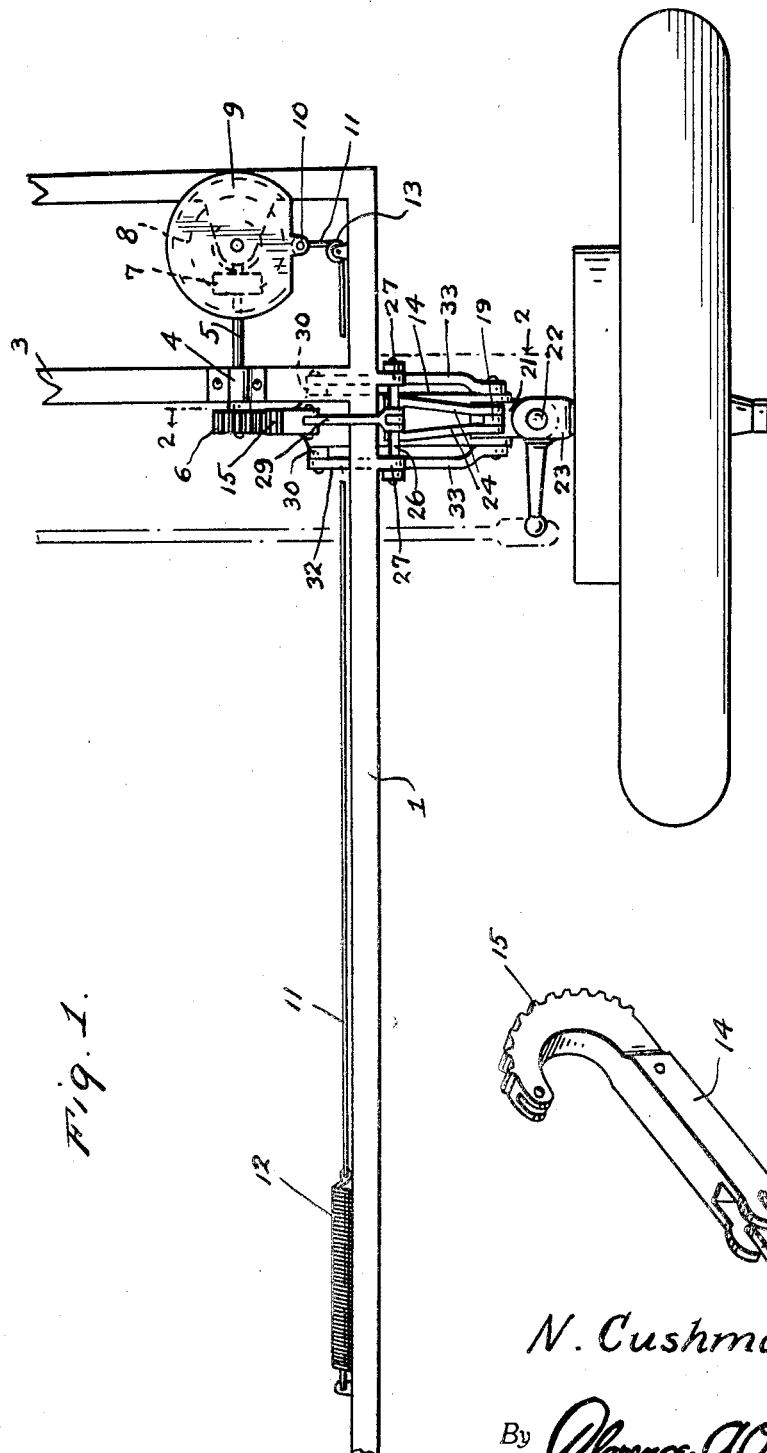
Figure 1 is a plan view showing the under part of a vehicle with the invention in use.
Figure 2:
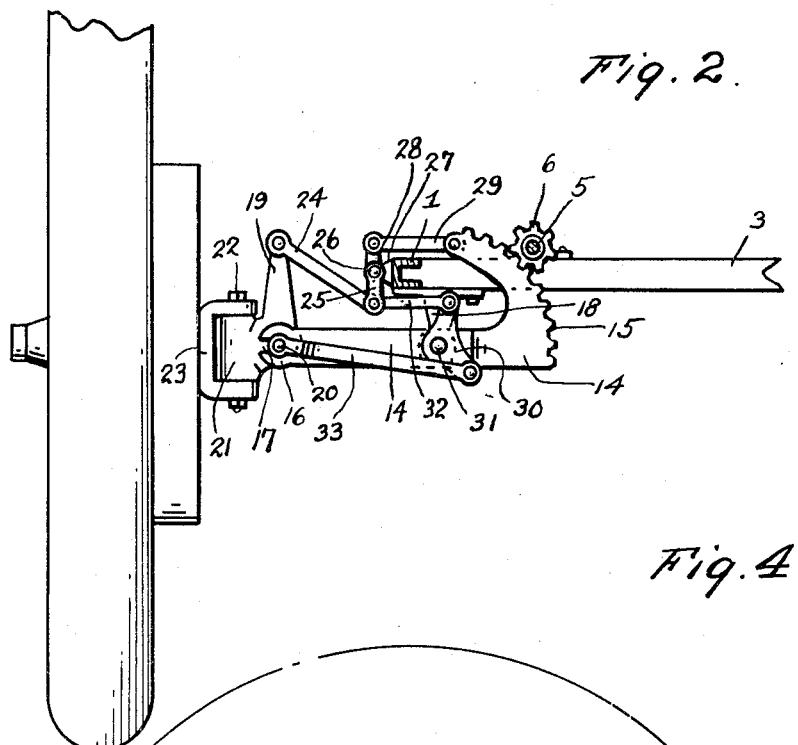
Fig. 2 is a section on line 2—2 of Fig. 1.
Figure 4:
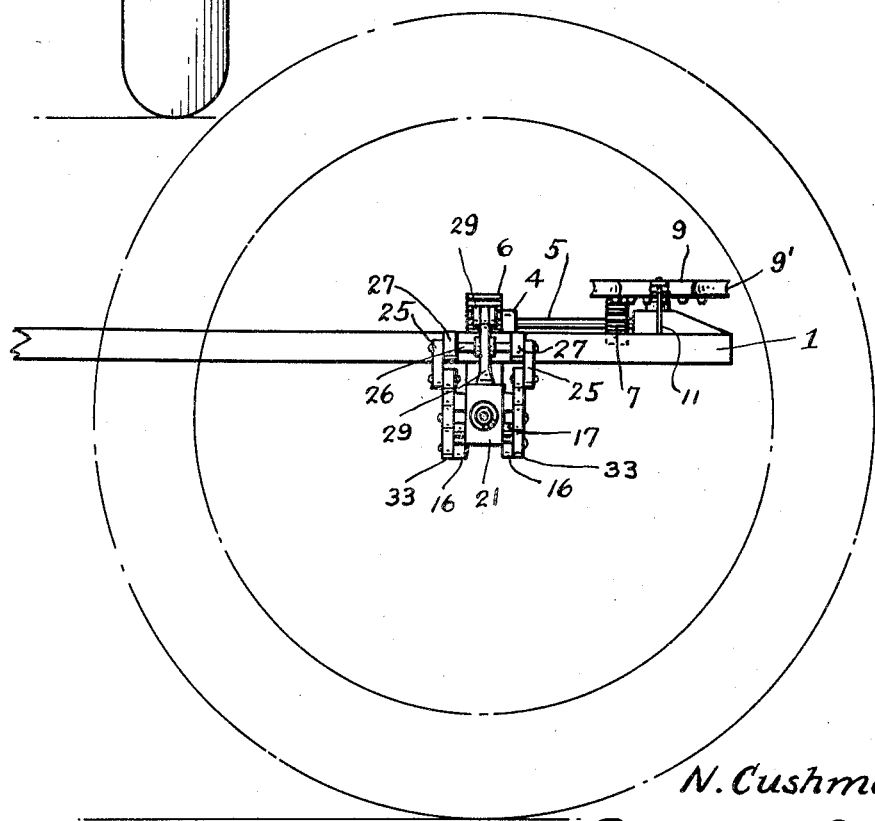
Fig. 4 is a side view.

In these views, the numeral 1 indicates the chassis frame which includes a bar 3 carrying the bearings 4 for a shaft 5 which has the pinions 6 and 7 at its ends. The pinion 7 meshes with an annular rack 8 on a grooved disk 9 which has an ear 10 on a part of its periphery to which is attached one end of a cable 11, the other end of which is attached to a spring 12 attached to a part of the frame, the cable passing over a pulley 13. When the disk 9 is turned, a part of the cable will engage the groove 9' therein.

A bar 14 has its inner end of hook shape with the outer edge of this hook-shaped part formed with teeth 15 and the outer end of the bar is forked with the prongs 16 provided with the slots 17. This bar 14 is pivoted in the hanger 18 with the pinion 6 meshing with the rack teeth 15 and a member 19 has a pivot pin 20 passing therethrough which also passes through the slots 17 in the prongs 16 and this member is formed with a part 21 which has a vertical bore for receiving the bolt 22 which connects the forked inner end of the spindle 23 with said part 21. The part 21 also has an upwardly extending arm to which a link 24 is pivoted, one on each side of the arm and these links are in turn pivoted to the crankarms 25 of a shaft 26 journalled in the bracket 27 attached to an outer part of the frame 1, said shaft having an upwardly extending arm 28 thereon which is connected by a link 29 to the extremity of the hook-shaped part of the bar 14.

A pair of double levers 30 is fastened at their centers on the pivot member 31 which connects the bar 14 to the hanger 18 and a link 32 connects the upper end of each lever 30 with the lower end of an arm 25 and a link 33 is pivoted to the lower end of each double lever and extends forwardly and is connected with the pivot 20.

Thus it will be seen that movement of the rack bar 14 will cause a rocking movement of the crank shaft 26 which will result in the raising or lowering of the spindle carrying part 21 and at the same time said spindle carrying member is moved by having its pivot 20 moved inwardly or outwardly in the slots 17 through means of the links 33 and the double levers 30 and this movement of the bar 14 is controlled by the spring 12 which acts to maintain the movable rack bar in an outward position.

It will of course be understood that a complete device is necessary for each wheel, and if desired, the bar 3 may be made in the form of an axle and the bar 14 pivoted directly to the end thereof. Thus, the axle when complete will be composed of three main sections, a stationary central section, and a bar 14 pivoted to each end thereof.

A complete axle will of course be required for either or both ends of a vehicle frame together with an individual assembly of the entire invention for each wheel. The middle section is fastened securely and rigidly to the channel steel frame of the vehicle, all road shocks being absorbed by the single coil spring the power of which is supplemented by a wrench arrangement.

All other moving parts with the exception of the wrench are intended to hold and maintain the wheels of the vehicle in their uniform and proper position in respect to the chassis.

It is thought from the foregoing description that the foregoing advantages and novel features of the invention will be readily apparent.

It is to be understood that changes may be made in the construction and arrangement of the several parts, provided that such changes fall within the scope of the appended claims.

Having thus described my invention, what I claim as new is:—

1. In combination with a frame and wheel of a vehicle, a bar pivotally supported by the frame and having a curved inner end the outer edge of which is formed with teeth, a shaft journalled in the frame and having a pinion thereon meshing with the teeth, a spring controlled member having a circular rack thereon, a second pinion on the shaft engaging the last-mentioned rack, a crank shaft journalled in the frame, an arm on the crank shaft, a link connecting the arm with the extremity of the hook-shaped part of the bar, a spindle carrying member, a pivot therefor passing through the slotted other end of the bar, an upwardly extending arm on the spindle carrying member, links connecting the upper end of said arm to the crank of the shaft, a double lever pivotally supported by the pivot of the bar, a link connecting the upper end of the said double lever to one of the cranks of the shaft, and a link connecting the lower end of the lever with the pivot of the spindle carrying member.

2. In combination with a frame and wheel carrying spindle of a vehicle, a bar pivotally supported from the frame and having its outer end formed with prongs slotted, a spindle carrying member located between the prongs, a pivot therefor passing through the slots of the prongs, a crank shaft journalled in the frame, links connecting the crank shaft to the upper end of said arm, an arm on the crank shaft, a link connecting the same to the extremity of the curved part of the bar, rack teeth on said bar, double levers pivotally supported by the pivot of the bar, links connecting the upper ends of said levers to the crank arm, links pivotally connected to the lower ends of said double levers and having their outer ends connected with the pivots of the spindle carrying member, a shaft journalled in the frame and having a pinion at one end thereof engaging with the rack teeth of the bar, a second pinion on said shaft, a grooved disk having an annular rack thereon engaging with the second pinion, a cable connected with the disk and a spring connecting the cable with a part of the frame.

NED CUSHMAN.